Nov. 16, 1937.  F. A. NICHOLSON ET AL  2,099,218
DRIVING MECHANISM TO MAINTAIN CONSTANT THE REQUIRED
LENGTH OF AN ENDLESS DRIVING MEANS
Filed Dec. 21, 1936
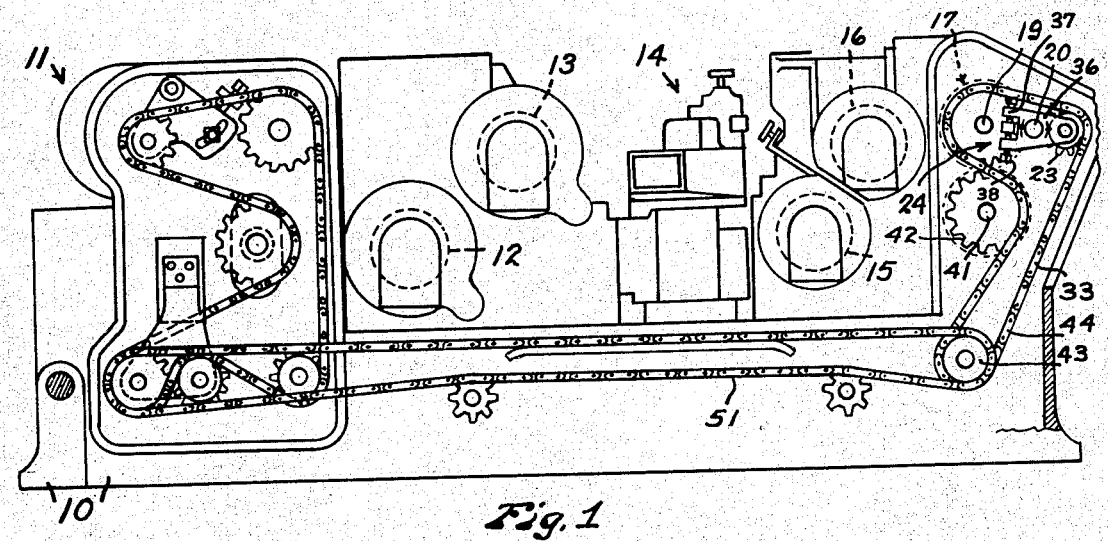
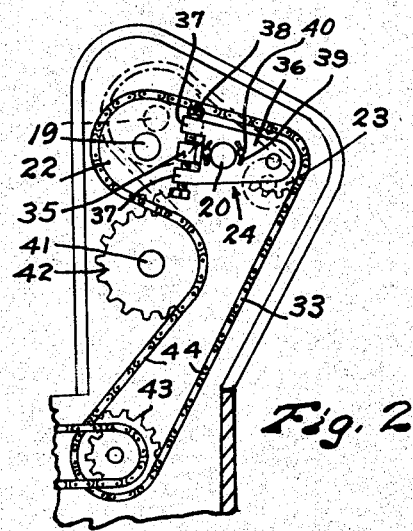
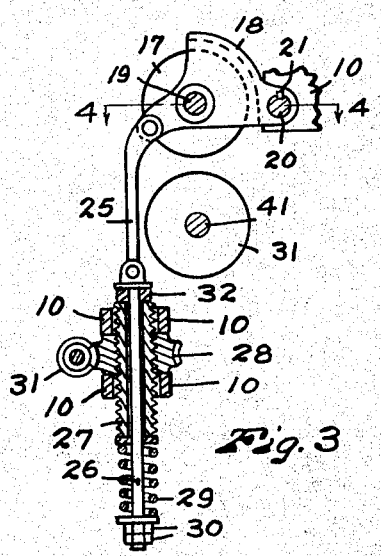
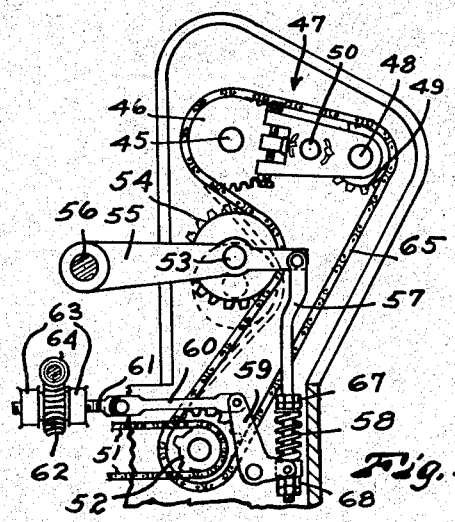
INVENTORS
WILMOT T. PRITCHARD
FREDERICK A. NICHOLSON
BY
ATTORNEY Patented Nov. 16, 1937

2,099,218

UNITED STATES PATENT OFFICE 2,099,218

DRIVING MECHANISM TO MAINTAIN CONSTANT THE REQUIRED LENGTH OF AN ENDLESS DRIVING MEANS

Frederick A. Nicholson and Wilmot T. Pritchard, Seattle, Wash., assignors to Stetson-Ross Machine Company, Seattle, Wash., a corporation of Washington Application December 21, 1936, Serial No. 116,960

5 Claims. (Cl. 74—242.15)

This invention relates to a driving mechanism and particularly to means to maintain substantially constant the required length of an endless driving means to be threaded over a plurality of wheels, some of which are mounted on movable supports.

This application is related to our co-pending applications Serial Nos. 116,961, 116,962, 116,963, 116,964, and 116,965, which are being simultaneously filed herewith and which co-pending applications claim some of the inventions herein disclosed.

In the prior art where an endless driving means was threaded over a plurality of wheels, some of which wheels were mounted on movable supports, it has been the practice to use tightener means to maintain the proper tension on the endless driving means. Such devices operated satisfactorily where the tightener was placed on the slack side of the endless driving means. However, such prior art devices, which generally included a spring loaded or gravity weighted tightener, did not operate satisfactorily where the direction of travel of the driving means was subject to reversal. This for the simple reason, that upon reversal, the tightener was no longer on the slack side of the driving means. Where reversible endless driving means were employed over a plurality of wheels, some of which were mounted on movable supports, the prior art has gone to complex mechanisms in an attempt to maintain the desired tension of the endless driving means. Such prior art devices were not satisfactory as they did not provide the desired degree of simplicity to prevent costly shut-downs and continual repair of the mechanism. Also where heavy driving strains were encountered, the difficulties were increased.

It is the object of our invention to provide a simple, efficient and practical mechanism which will permit an endless driving means to be threaded over a plurality of wheels, some of which are mounted on movable supports, and where the length of the endless driving means will remain substantially constant despite the movement of some of the wheel means.

It is more particularly an object of this invention to provide a pivotal supporting means with wheel means mounted on opposite sides of the pivotal mounting in a mechanism employing a plurality of wheels and an endless driving means, whereby pivotal movement of the pivotal supporting means will move one wheel supported thereon in a direction tending to tighten the endless driving means and move the other wheel supported thereon in a direction tending to loosen the endless driving means. The length of endless driving means required will therefore remain, for practical purposes, substantially constant despite the fact that some of the wheels in the mechanism are mounted on movable supports.

The above mentioned general objects of our invention, together with others inherent in the same, are attained by the mechanism, illustrated in the following drawing, the same being preferred exemplary forms of embodiment of our invention, throughout which drawing like reference numerals indicate like parts:

Figure 1 is a view in elevation, with parts removed, of a planer mechanism embodying this invention;

Figure 2 is a detached fragmentary view in elevation, of the particular portion of the driving mechanism embodied in this invention, showing by dot and dash lines a position which the pivotal support and wheels thereon may assume;

Figure 3 is a detached view partly in section and partly in elevation of adjusting means for moving an upper feed roll of the planer mechanism and the pivotally mounted wheel support which is connected therewith;

Figure 4 is a detached sectional view taken on substantially line 4—4 of Figure 3; and Figure 5 is a view of a modified form of this invention, which figure is similar to Figure 2, but showing in addition thereto means to adjustably support another wheel.

In describing and illustrating this invention we have shown the same as applicable in connection with the driving of feed rolls of a planing device. It is to be expressly understood that this invention is not limited to any such specific application and the same is set forth only as illustrative of one environment in which this invention may be utilized. Also for purposes of definiteness of illustration, we have illustrated the invention in connection with an endless sprocket chain threaded over a plurality of sprockets. In this connection the mechanism may obviously be used in connection with any wheel means and endless driving means, threaded thereover and sprockets and an endless sprocket chain are only examples thereof.

In Figure 1 all of the details of the planer mechanism are not shown and will be only generally described, as such details are considered essential to this invention.

A frame 10 supports the planer mechanism. Feeding mechanism indicated generally by 11 is shown at the "infeeding" end of the machine.

This feeding mechanism urges lumber stock past a lower cutter head mechanism 12 and an upper cutter head mechanism 13. The lumber is then urged past edge matcher mechanism indicated generally by 14. Lower and upper face pattern forming cutter head mechanisms 15 and 16 may be provided in connection with the planer mechanism.

The "outfeeding" mechanism, with which this invention is concerned, is shown at the right of Figure 1 of the drawing. Here an upper feed roll 17, see Figs. 3 and 4, is journaled in a yoke member 18 on a shaft 19. This yoke member 18 is fixedly secured to a shaft 20, as by key means 21. A sprocket wheel 22 is mounted on shaft 19 and the sprocket wheel 23 is mounted on the adjustable mechanism indicated generally by the arrow 24 in Fig. 4. Thus the shaft 20 serves as a fulcrum with sprocket 22 mounted on one side thereof and sprocket 23 on the other side thereof. As the sprocket 22 is raised, sprocket 23 is lowered and vice versa.

This means, for raising the feed roll 17 and in turn for pivoting the sprockets 22 and 23 about the shaft 20, is shown in Figs. 3 and 4 of the drawing. One end of the link member 25 is pivotally secured to the yoke member 18 and the other end of the link member 25 is pivotally secured to another link member 26. The link member 26 is slidable within a threaded sleeve 27, which sleeve is meshed with an internally threaded worm wheel 28. The worm wheel 28 is held in place by the portions of the frame 10. A compression spring 29 is positioned on link 26 and between nut means 30 and the threaded sleeve 27. Thus, the link member 26 will move upwardly in response to upward movement of the feed roll 17 independently of the threaded sleeve 27. Also when the threaded sleeve 27 is moved upwardly by rotation of worm wheel 28, the rolls 17 will be moved upwardly and the same spring tension will be provided, resiliently resisting upward movement of the feed rolls 17 independently of the threaded sleeve 27. Movement of the worm wheel 28 may be had by the operation of the worm 31 and hand wheel 32.

Thus, lumber passing between feed roll 17 and feed roll 31, if the same is thicker than the size of the opening between said feed rolls, will raise feed roll 17 by compressing spring 29. Also the lower position of the feed roll 17 is determined when stop 32 rests against threaded sleeve 27.

As the feed roll 17 raises and lowers, carrying shaft 19 therewith, the sprocket wheel 22, which is connected with said shaft 19, likewise raises and lowers. At the same time the shaft 20 is angularly moved by the raising and lowering of feed roll 17, which in turn raises and lowers sprocket wheel 23, which is connected with the shaft 20, by reason of the adjusting mechanism generally indicated by 24 in Fig. 4. This adjusting mechanism 24 provides for relative movement between the sprocket wheel 23 and the sprocket wheel 22, and for initial adjustment of the tension of endless sprocket chain 33 which will be hereinafter discussed.

This adjusting mechanism comprises an arm member 34 keyed to the shaft 20. The arm member 34 is provided with a pawl 35, shown best in Fig. 2. Another arm member 36 is pivotally secured on shaft 20 and has a U-shaped portion 37 operatively positioned as respects the said pawl 35. Set screws 38 provide for adjustable relative movement between the U-shaped portion 37 and the pawl 35 and in turn adjustable relative motion between the sprocket wheels 22 and 23. Slots 39 are provided in the arm member 36 and cap screws 40 pass through said slots 39 and are threaded into the arm member 34. After loosening the cap screws 40, the set screws 38 may adjust the mechanism described and then the cap screws 40 may be tightened to serve as additional means to hold such adjustment.

The adjustable mechanism 24 just described thus comprises a pivotal supporting means where a wheel, such as a sprocket wheel 22, is rotatably mounted thereon at one side of the pivotal support and another wheel, such as a sprocket wheel 23, is rotatably mounted thereon and to the other side of said pivotal support. As the sprocket wheel 22 rises because of lumber passing through the planing machine, the sprocket wheel 23 will be lowered and vice versa.

The lower feed roll 31 is supported by shaft 41 and another driven wheel such as sprocket wheel 42 is supported on shaft 41. A driving wheel, such as sprocket wheel 43, is connected by endless driving means 51 to a source of power (not shown) and such sprocket wheel 43 is journaled in the main frame 10 of the machine. An endless driving means, such as the endless chain 44, is threaded around sprocket wheels 43, 23, 22 and 42. To provide an initial adjustment for such endless chain 44 and to compensate for wear between such chain and the said sprocket wheels, the adjusting mechanism generally indicated by 24 in Fig. 4 is provided. After the endless chain 44 is initially adjusted, any difference in length of chain required because of upward or downward movement of the roll 17 and in turn the sprocket wheel 22 is substantially compensated for by the downward or upward movement of the sprocket wheel 23. Referring to Fig. 2, as the sprocket wheel 22 moves from the full line position to the dot and dash line position, the sprocket wheel 23 also moves from its full line position to its dot and dash line position and thus as one lap of the chain becomes longer, the other lap of the chain becomes shorter in substantially the same proportions.

This provides for a feeding mechanism wherein a sprocket wheel may raise or lower without substantially changing the length of the feeding chain over a plurality of sprockets which include the sprocket which is thus raising and lowering. This has proved a very practical device and where the movement of a sprocket wheel is within the limits required for the "outfeeding" rolls of a planing machine, such as up to four or five inches, the chain may be threaded over sprocket wheels without other tightener means being employed. When sprocket wheels and chains are employed, the depth of contact between the teeth on the sprocket wheels and the chain may be initially selected so that small discrepancies will not practically affect the operation. Also where belt or chain tighteners are eliminated, the direction of movement of the chain may be reversed from time to time without inconvenience or damage to the parts.

At the "infeeding" end of the planing device shown in Figure 1, we have shown a driving mechanism, generally indicated by 11 which is the subject matter of our said copending applications, Serial Nos. 116,961, and 116,962. This driving mechanism provides for the use of feed beds or two upper and lower feed rolls. In Fig. 5 of the drawing, we have shown the present invention in connection with the "infeeding" end of a machine where an upper and a lower feed roll are employed. Here an upper feed roll (not shown) is mounted on a shaft 45. A sprocket wheel 46 is mounted on said shaft 45. The sprocket wheel 46 is mounted on the pivotally mounted adjustable mechanism generally indicated by 47. This mechanism may be similar to the adjustable mechanism described in connection with Figs. 2 and 4 and which was indicated generally by 24 in Fig. 4. A shaft 48 is mounted on the adjustable mechanism 47 and rotatably supports sprocket wheel 49 to one side of the shaft 50, which shaft 50 serves as a pivotal support. A driven sprocket wheel 52, which corresponds with the driven sprocket wheel 43 of Figs. 1 and 2, is illustrated. This driving sprocket wheel 52 is connected by an endless driving means 51, as indicated in Figure 1, to a source of power (not shown). Thus as the upper feed roll (not shown) moves upwardly and carries with it the sprocket wheel 46, the sprocket wheel 49 will be lowered, providing compensation as discussed in connection with Figs. 1 and 2.

In Fig. 5 the lower feed roll (not shown) is mounted on a shaft 53. On this shaft 53 a driven sprocket wheel 54 is mounted. An arm 55 has one end rotatably mounting the shaft 53 and the other end of the arm 55 is pivotally supported by a shaft 56 connected to the main frame 10 of the machine. A link 57 has one end pivotally secured to the arm 55 and the other end slidably extending through one arm of a bell crank 59. Compression spring means 58 is provided on link 57 between bell crank 59 and a fixed collar 67 on said link 57. Nut means 68 is provided on link 57 below bell crank 59. A link 60 has one end connected with the other arm of the bell crank 59 and the other end of link 60 is connected with a screw 61. The screw 61 is threadedly engaged with a worm wheel 62, which worm wheel 62 is secured in place by portions of the main frame of the machine 63. A worm 64 is connected with the worm wheel 62 and angular movement of the worm 64 will impart a rotary movement to the worm wheel 62, causing the screw 61 and link 60 to move toward and away from the worm wheel 62. This movement through the bell crank and link means shown will raise or lower the link 57 and in turn the arm 55 and the feed roll supported on the shaft 53. Also as different sized pieces of lumber are generally encountered at the "infeeding" end of the machine, the feed roll supported on the shaft 53 may move up and down as indicated by the full line and the dot and dash line positions, which will compress the spring 58, permitting such movement. As the lower feed roll 31 and the sprocket wheel 54 move up and down independently of the upper feed roll 17 and the sprocket wheel 46 connected therewith, this will not substantially change the length of endless chain required, as is set forth and explained in our copending application Serial No. 116,962. An endless driving means, such as an endless chain 65, is threaded around the sprocket wheels 49, 46, 54 and 52. The sprocket wheel 52 is mounted on the main frame of the machine and is connected to a source of power (not shown) by means of endless driving means 51, as previously described.

In the foregoing we have described the invention as applicable to a planing device, such as that disclosed in our copending application Serial No. 91,568. In such a planing device the lower bed is resiliently mounted as distinguished from the commercial prior art planing machines where the upper beds are resiliently mounted. Obviously the invention herein can be readily adapted to ordinary planing machines as well as to the planing mechanism disclosed in said application Serial No. 91,568.

Obviously, changes may be made in the forms, dimensions and arrangement of the parts of our invention, without departing from the principle thereof, the above setting forth only preferred forms of embodiment.

We claim:

1. In a device of the class described, wheel mounting means; pivotal supporting means for said wheel mounting means; a first rotatable wheel mounted on said wheel mounting means and to one side of the said pivotal supporting means; a second rotatable wheel mounted on said wheel mounting means and to the other side of said pivotal supporting means; other wheel mounting means; a third rotatable wheel mounted on said other wheel mounting means and offset relative to said first and second wheels; and an endless driving means threaded over said first, second and third wheels, whereby, upon pivotal movement of said pivotal supporting means the difference in length of the endless driving means required between the third wheel and the first wheel is substantially compensated for by the length of the endless driving means required between the third wheel and the second wheel.

2. In a device of the class described, wheel mounting means; pivotal supporting means for said wheel mounting means; a first rotatable wheel mounted on said wheel mounting means and to one side of the said pivotal supporting means; a second rotatable wheel mounted on said wheel mounting means and to the other side of said pivotal supporting means; means operatively connecting with said wheel mounting means and providing for relative movement between said first and second wheels; other wheel mounting means; a third rotatable wheel mounted on said other wheel mounting means and offset relative to said first and second wheels; and an endless driving means threaded over said first, second and third wheels, whereby, upon pivotal movement of said pivotal supporting means the difference in length of the endless driving means required between the third wheel and the first wheel is substantially compensated for by the length of the endless driving means required between the third wheel and the second wheel.

3. In a device of the class described, a mounting means; pivotal supporting means for said mounting means; a feed roll journaled in said mounting means and to one side of said pivotal supporting means; a first driven rotatable wheel mounted on said feed roll; a second driven rotatable wheel mounted on said mounting means and to the other side of said pivotal supporting means; other wheel mounting means; a third rotatable driving wheel mounted on said other wheel mounting means and offset relatively to said first and second wheels; and an endless driving means threaded over said first, second and third wheels, whereby, upon pivotal movement of said feed roll and said pivotal supporting means the difference in length of the endless driving means required between the third wheel and the first wheel is substantially compensated for by the length of the endless driving means required between the third wheel and the second wheel.

4. In a device of the class described, a mounting means; pivotal supporting means for said mounting means; a feed roll journaled in said mounting means and to one side of said pivotal supporting means; a first driven wheel mounted on said feed roll; a second driven rotatable wheel mounted on said wheel mounting means and to the other side of the pivotal support; other wheel mounting means; a third driving rotatable wheel mounted on said other wheel mounting means and offset relatively to said first and second wheel; another feed roll; a fourth driven wheel mounted on said other feed roll; and an endless chain driving means threaded over said first, second, third, and fourth wheels, whereby, upon pivotal movement of said feed roll and said pivotal supporting means the length of the endless driving means required to thread between said first, second, third and fourth wheels will remain substantially constant.

5. In a device of the class described, a mounting means; pivotal supporting means for said mounting means; a feed roll journaled in said mounting means and to one side of said pivotal supporting means; a first driven wheel mounted on said feed roll; a second driven rotatable wheel mounted on said wheel mounting means and to the other side of the pivotal support; other wheel mounting means; a third driving rotatable wheel mounted on said other wheel mounting means and offset relatively to said first and second wheels; movably mounted feed roll supporting means; another feed roll journaled in said movably mounted feed roll supporting means; a fourth driven wheel mounted on said other feed roll; and an endless chain driving means threaded over said first, second, third and fourth wheels, whereby, upon pivotal movement of said feed roll and said pivotal supporting means the length of the endless driving means required to thread between said first, second, third and fourth wheels will remain substantially constant.

FREDERICK A. NICHOLSON.
WILMOT T. PRITCHARD.